United States Patent
Wang et al.

(10) Patent No.: US 12,198,536 B2
(45) Date of Patent: *Jan. 14, 2025

(54) FACTORY AND USER CALIBRATION OF HAPTIC SYSTEMS

(71) Applicant: Google LLC, Mountain View, CA (US)

(72) Inventors: Jianxun Wang, Sunnyvale, CA (US); Debanjan Mukherjee, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,786

(22) Filed: Mar. 17, 2023

(65) Prior Publication Data

US 2023/0222882 A1     Jul. 13, 2023

Related U.S. Application Data

(63) Continuation of application No. 16/846,468, filed on Apr. 13, 2020, now Pat. No. 11,610,459.

(51) Int. Cl.
*G08B 6/00*   (2006.01)
*H02P 25/032*   (2016.01)

(52) U.S. Cl.
CPC ............. *G08B 6/00* (2013.01); *H02P 25/032* (2016.02)

(58) Field of Classification Search
None
See application file for complete search history.

(56) References Cited

U.S. PATENT DOCUMENTS

| | | | | |
|---|---|---|---|---|
| 6,061,004 A * | 5/2000 | Rosenberg | ............. | G06F 3/016 341/20 |
| 7,446,752 B2 * | 11/2008 | Goldenberg | ............ | G06F 3/016 310/15 |
| 7,616,192 B2 * | 11/2009 | Schroeder | ............. | G06F 3/0421 345/173 |
| 8,308,558 B2 * | 11/2012 | Thorner | ................ | G06F 3/016 463/47 |
| 9,348,413 B2 * | 5/2016 | Adachi | ............... | G06F 3/03547 |
| 9,384,645 B1 * | 7/2016 | Allen | ....................... | G08B 3/10 |
| 9,551,608 B2 * | 1/2017 | Cho | .................... | G06Q 10/0639 |
| 9,760,174 B1 * | 9/2017 | Letendre | ................. | G08B 6/00 |

(Continued)

OTHER PUBLICATIONS

William G. Wong. "Self Calibrating Haptic Chip Uses Less Power." Electronic Design. Apr. 3, 2013. 7 pages. Retrieved from the Internet: <https://www.electronicdesign.com/technologies/digital-ics/article/21795982/self-calibrating-haptic-chip-uses-less-power>.

*Primary Examiner* — Muhammad Adnan

(74) *Attorney, Agent, or Firm* — Lerner David LLP

(57) ABSTRACT

Methods and systems for calibrating a haptic system in an electronic device are provided. The calibration of the haptic system may be performed in a facility prior to a shipment to a user. The calibration may also be performed by a user prior to or after his/her use of the haptic system in the electronic device over time. A method for performing a calibration process in an electronic device includes generating a drive signal from a haptic driver in a haptic system disposed in an electronic device, transmitting the drive signal to an actuator in the haptic system, detecting a back Electromotive Force (bEMF) signal from the actuator in the haptic system, analyzing an output waveform from the bEMF signal, and adjusting a scale of the drive signal generated from the haptic driver.

20 Claims, 7 Drawing Sheets

(56) References Cited

U.S. PATENT DOCUMENTS

| | | | |
|---|---|---|---|
| 10,108,265 B2* | 10/2018 | Harley | G06F 3/016 |
| 10,126,998 B2* | 11/2018 | Yuen | H04L 67/306 |
| 10,155,159 B2* | 12/2018 | Jones | A63F 13/28 |
| 10,466,790 B2* | 11/2019 | Sun | G06F 3/016 |
| 10,490,035 B2* | 11/2019 | Morrell | H04L 12/1895 |
| 10,551,926 B1* | 2/2020 | Israr | G06F 3/167 |
| 10,606,355 B1* | 3/2020 | Zhang | G06F 3/046 |
| 10,729,974 B2* | 8/2020 | Seiler | G06F 3/016 |
| 10,901,814 B2* | 1/2021 | Ogita | G06F 3/016 |
| 11,126,266 B1* | 9/2021 | Xiao | G01H 11/00 |
| 11,307,664 B2* | 4/2022 | Long | G06F 3/04815 |
| 11,402,904 B1* | 8/2022 | Jung | A61B 5/6825 |
| 2011/0225534 A1* | 9/2011 | Wala | G06F 3/04817 345/175 |
| 2012/0229264 A1* | 9/2012 | Company Bosch | B06B 1/0253 340/407.1 |
| 2013/0033366 A1* | 2/2013 | Mcdonough | G06F 3/016 340/407.1 |
| 2013/0293494 A1* | 11/2013 | Reshef | G06F 3/041 345/173 |
| 2014/0015652 A1* | 1/2014 | Han | G08B 6/00 340/407.1 |
| 2015/0235531 A1* | 8/2015 | Lee | G08B 6/00 340/407.1 |
| 2016/0144404 A1* | 5/2016 | Houston | H02K 33/00 318/114 |
| 2016/0203684 A1* | 7/2016 | Jacobi | G08B 1/08 340/539.15 |
| 2016/0231815 A1* | 8/2016 | Moussette | G06F 3/016 |
| 2016/0258758 A1* | 9/2016 | Houston | G01D 5/145 |
| 2016/0259480 A1* | 9/2016 | Augenbergs | G01L 5/0028 |
| 2017/0021762 A1* | 1/2017 | Daman | B60K 35/10 |
| 2017/0053502 A1* | 2/2017 | Shah | G06F 3/016 |
| 2017/0085112 A1* | 3/2017 | Leabman | H02J 50/402 |
| 2017/0205883 A1* | 7/2017 | Tanaka | G06F 3/041 |
| 2017/0243452 A1* | 8/2017 | Levesque | G06F 3/016 |
| 2018/0059793 A1* | 3/2018 | Hajati | H02K 33/02 |
| 2018/0204426 A1* | 7/2018 | Nagisetty | H04B 1/385 |
| 2018/0243163 A1* | 8/2018 | Choudhury | A61H 23/02 |
| 2018/0267074 A1* | 9/2018 | Keal | G01P 13/00 |
| 2019/0103829 A1* | 4/2019 | Vasudevan | H02P 23/12 |
| 2019/0122507 A1* | 4/2019 | Roh | H04M 19/047 |
| 2019/0235628 A1* | 8/2019 | Lacroix | G06F 3/016 |
| 2019/0278372 A1* | 9/2019 | Nakagawa | A63F 13/285 |
| 2019/0304267 A1* | 10/2019 | Kanai | H02P 25/032 |
| 2019/0384400 A1* | 12/2019 | Cruz-Hernandez | G06F 3/016 |
| 2019/0385421 A1* | 12/2019 | Shah | G08B 6/00 |
| 2020/0039558 A1* | 2/2020 | Aerts | G06F 3/016 |
| 2020/0078260 A1* | 3/2020 | Choudhury | A61H 19/34 |
| 2020/0081540 A1* | 3/2020 | Cincione | G06F 3/016 |
| 2020/0103972 A1* | 4/2020 | Amin-Shahidi | G06F 3/0346 |
| 2020/0233551 A1* | 7/2020 | Qian | G06F 3/0488 |
| 2020/0356172 A1* | 11/2020 | Fainstain | G06F 3/015 |
| 2020/0356173 A1* | 11/2020 | Bajaj | G08B 6/00 |
| 2021/0004561 A1* | 1/2021 | Xu | G06V 40/1318 |
| 2021/0096649 A1* | 4/2021 | Mok | G06F 3/016 |
| 2021/0250439 A1* | 8/2021 | Sun | G06F 3/04883 |
| 2021/0319677 A1* | 10/2021 | Wang | H02P 25/032 |
| 2022/0004260 A1* | 1/2022 | Xiao | G01H 1/00 |
| 2022/0111536 A1* | 4/2022 | Song | G06F 3/016 |
| 2023/0012278 A1* | 1/2023 | Vule | A61B 5/6815 |
| 2023/0027925 A1* | 1/2023 | Luo | G06F 3/016 |
| 2023/0259209 A1* | 8/2023 | D'Souza | B06B 1/0261 340/407.1 |
| 2024/0019938 A1* | 1/2024 | Whitmire | G06F 3/016 |
| 2024/0028129 A1* | 1/2024 | Whitmire | G06F 1/163 |

* cited by examiner

FACTORY AND USER CALIBRATION OF HAPTIC SYSTEMS

CROSS REFERENCE TO RELATED APPLICATIONS

This application is a continuation of U.S. application Ser. No. 16/846,468, filed on Apr. 13, 2020, the disclosure of which is incorporated herein by reference.

FIELD

The present disclosure relates to an electronic device. More specifically, the present disclosure relates to a calibration process of a haptic system in the electronic device.

BACKGROUND

Haptic systems are widely used in wearable devices, medical devices, entertainment devices, portable devices or holdable devices, such as mobile phones. Haptic systems provide tactile and force feedback technology that takes advantage of a user's sense of touch by applying haptic feedback effects, such as forces, sounds, vibrations, and motions, to the user. The user interacts with electronic devices through a user interface, such as a touch screen. In some examples, haptic effects can be generated by an electro-mechanical system. The haptic system often produces a drive signal that causes an actuator in the haptic system to produce the haptic effect. For example, the actuator may produce a tactile response by mechanically vibrating the actuator.

However, the feel of the haptic effects may vary from device to device due to manufacturing deviations or material variations. These inherent variations in properties of the devices often result in different haptic effects or haptic output performance of the electric devices that may not meet expectations from different individual users. Furthermore, the haptic effects may vary or drift over time as the device is continuously used. For examples, the actuator may have properties change over time after continuous use from the user, thus adversely changing the haptic effects or haptic output performance of the device. In addition, in some situations, diverse types or scales of haptic effects are sometimes desired in response to different movements and characteristic generated with respect to each user's preference.

BRIEF SUMMARY

Methods and systems for calibrating a haptic system in an electronic device are provided. The calibration of the haptic system may be performed in a facility prior to a shipment to a user. The calibration may also be performed by a user prior to or after his/her use of the haptic system in the electronic device as needed.

One aspect of the disclosure provides a method for performing a calibration process in an electronic device includes generating a drive signal from a haptic driver in a haptic system disposed in an electronic device, transmitting the drive signal to an actuator in the haptic system, detecting a back Electromotive Force (bEMF) signal from the actuator in the haptic system, analyzing an output waveform from the bEMF signal and adjusting a scale of the drive signal generated from the haptic driver. The output waveform from the back Electromotive Force (bEMF) signal comprises a sinusoidal waveform.

According to some examples, the method may further include detecting a stationary state of the electronic device prior to generating the drive signal. In some examples, the method may further include comparing the output waveform with a target waveform set for the back Electromotive Force (bEMF) signal. In some examples, the method may further include adjusting an amplitude of the output waveform. In some examples, the method may further include altering a haptic output generated from the actuator in the haptic system. In some examples, the method may further include receiving an input signal applied to the haptic system to generate the drive signal. In some examples, the input signal is applied by a user. In some examples, the input signal is applied by a working staff in a factory. In some examples, the drive signal is in direct communication with the actuator disposed in close proximity to the haptic driver in the haptic system. In some examples, the drive signal is a voltage signal or a current signal.

According to some examples, the method may further include storing the adjusted scale of the drive signal in the electronic device. In some examples, the electronic device is a wearable device or a portable device.

Another aspect of the disclosure provides a method for performing a calibration process in an electronic device includes tracking a haptic output from an actuator in a sensorless haptic system by detecting a back Electromotive Force (bEMF) signal from the actuator, wherein the sensorless haptic system is embedded in a wearable device or portable device, adjusting a voltage or current applied a haptic driver in the sensorless haptic system in response to the tracked haptic output, and adjusting a scale of the haptic output.

According to some examples, the calibration process is performed by a working staff in a factory or by a user. In some examples, the method may further include storing the adjusted scale of the haptic output in a memory device in the wearable device or portable device for future calibration.

Yet another aspect of the disclosure provides an electronic device includes a sensorless haptic system disposed in an electronic device. The sensorless haptic system includes a haptic driver, and an electromagnetic (EM) actuator disposed in close proximity to the haptic driver, wherein the electronic device is a wearable device or a portable device.

According to some examples, the actuator is physically connected to the haptic driver. In some examples, an input interface in electronic communication to the haptic driver. In some examples, the input interface is configured to interact with a user or a working staff in a factory for a calibration process.

DETAILED DESCRIPTION

Figure 1:
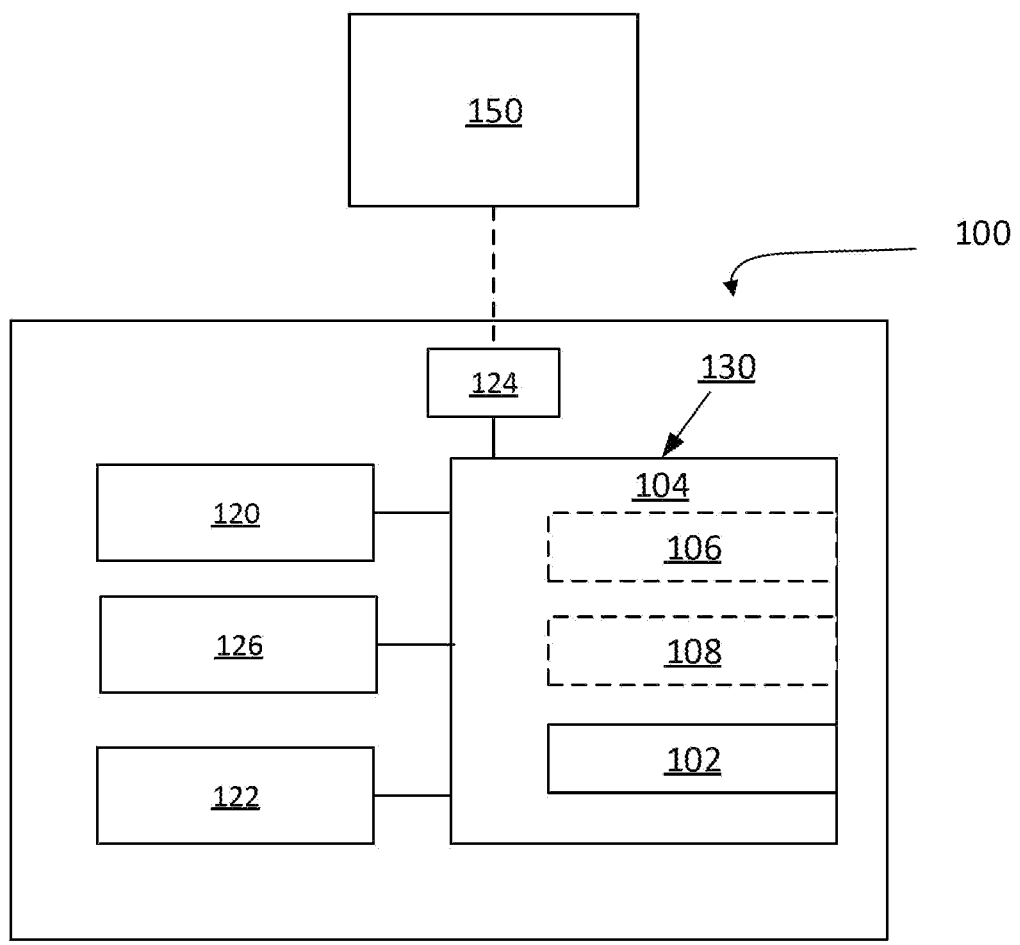
FIG. 1 is a block diagram illustrating an example of an electric device according to aspects of the disclosure.

The present disclosure provides methods for calibrating a haptic system. The calibration of the haptic system may be performed in a facility prior to a shipment to a user. The calibration may also be performed by a user prior to his/her use of the haptic system or after his/her use over a period of time. The haptic system includes a haptic driver electrically and/or physically connected, or in close proximity, to an actuator. As the haptic driver is in close proximity to the actuator or, in some examples physically coupled to, the actuator, the calibration is then sometimes also referred as an on-chip calibration. The calibration utilizes the haptic driver in the haptic system to perform the calibration to alter a haptic output performance of the actuator without using of additional external sensors, such as accelerometers, optical sensors, or other types of feedback sensors, for detection. Such haptic system also refers as a sensorless haptic system. The on-chip calibration provides an efficient and convenient facility calibration and/or user calibration in the haptic system without the need of using extraneous parts, additional testing stations and/or installation of testing fixtures for performing the calibration.

In one example, the actuator in the haptic system may include an electromagnetic (EM) actuator. The EM actuator converts an electrical energy provided from the haptic driver to a mechanical energy in a mechanical device in the actuator, or vice versa. When the electrical energy transmits to the mechanical device, an output, such as a back Electromotive Force (bEMF), is generated by the mechanical device. A controller embedded in the haptic system may capture, measure and analyze the bEMF to determine if the output is within a predetermined range, or matches a predetermined profile. When the output waveform has the predetermined profile, the calibration process is completed and/or terminated. In contrast, when the output does not match the target profile/waveform, the electrical energy, such as the drive signal from the haptic drive, may be programmed, adjusted, or calibrated until the desired output profile/waveform from the bEMF signal meets and matches the target profile/waveform. After calibration, the calibrated information may be stored in a memory device in communication with the haptic system.

Thus, detection and analysis of the measured bEMF allows the calibration process being performed within the sensorless haptic system with ease and without using extraneous parts. The calibration may be performed in the factory prior to the shipment to the user. Alternatively, the calibration may be performed by a user without the need to bring the electronic device back to the factory or facility for calibration. In some examples, the calibration may be automatically performed when a desired haptic output is not detected. Such calibration may be performed without the knowledge from the user. Accordingly, the calibration process is easily available to the user so that the interaction of the electronic device to the user can be more delightful, useful and instant. Thus, customer satisfaction rate is improved and the product return rate is reduced.

FIG. 1 illustrates a block diagram of an electronic device 100 that includes a haptic system 130 embedded therein. The electronic device 100 may include a communication connection 124 that facilitates communication with one or more additional electronic devices 150 as needed. The communication connection 124 may include RF transmitter, a receiver, a transceiver, universal serial bus (USB) communications, connecting ports or the like.

The haptic system 130 includes a haptic driver 102 disposed adjacent to or in close proximity to an actuator 104. In one example, the haptic driver 102 may be mounted on the haptic driver 102. In another example, the haptic driver 102 may be located inside the actuator 104. In yet another example, the haptic driver 102 may be configured as a separate integrated circuit located in close proximity to the actuator 104 or integrated in suitable locations of the haptic system 130. The haptic driver 102 is in electrical communication with the actuator 104 by connection pins, wires, signal lines, connection bus, or other suitable electrical communication structures as needed. In one example, the actuator 104 utilized in the haptic system 130 is an electromagnetic (EM) actuator. Suitable examples of the electromagnetic (EM) actuator include linear resonant actuator (LRA), linear solenoid actuator (LSA), eccentric rotating mass (ERM) and the like. The actuator 104 includes a mechanical device 106, such as a motor, a mass, a magnet, a moving component, or the like that may provide haptic output, such as vibratory output, when receiving a drive signal from the haptic driver 102.

A controller 108 may be embedded in the haptic system 100 to provide and generate a control signal to the haptic driver 102. The controller 108 may also provide an input interface that receives the control signal. The control signal may then be transmitted to the haptic driver 102 to generate a drive signal. Alternatively, the controller 108 may be located outside of the haptic system 130 that is in electrical communication to the haptic driver 102. In some examples, the control signal may be generated from a processor 120 in the electronic device 100, transmitting the control signal to the haptic driver 102 or through the controller 108 to the haptic driver 102. The controller 108 is in electrical communication with the processor 120. The haptic driver 102 receives the control signal from the controller 108 or the processor 120, thus generating a drive signal to the actuator 104. The actuator 104 may then provide an electrical signal to the mechanical device 106, converting into a mechanical movement to generate vibration, thus providing a haptic effect/output to the electronic device 100.

In one example, the processor 120 is in communication with the haptic system 130 so as to receive data or other signals from the haptic system 130 and to control the operation of the electronic device 100 accordingly. The processor 120 may be any electronic processor that may process, receive, and/or transmit instructions and operational signals. For example, the processor 120 may be a microprocessor or a microcomputer.

The processor 120 may further be in communication with a memory device 122 in the electronic device 100. The memory device 122 may store electronic data that may be utilized by the electronic device 100. For example, the memory device 122 may store electronic data, operating system data, software applications that may be executed to provide haptic output, content, e.g., audio files, document files, calibration information, user settings with respect to the haptic system 130 and the like. The software applications may also include instructions that cause haptic system to output various combinations of haptic output and tactile output as needed. The memory device 122 may include, without limitation, volatile storage, such as random access memory, non-volatile storage, such as read-only memory, flash memory, magnetic storage medium, optical storage medium, erasable programmable memory or any combinations thereof. In some examples, the memory device 122 may be embedded in the haptic system 130. It is noted that additional memory devices (not shown), such as removable or non-removable storage devices may also be utilized in the electronic device 100 as needed.

One or more sensors 126 may be included in the electronic device 100. The sensors 126 may include, without limitation, touch sensors, accelerometers, ambient light sensors, photodiodes, gyroscopes, signal sensors, heat measurement sensor, motion sensors, magnetometers, photoplethysmogram (PPG) sensor, activity monitor sensors, and the like. The sensors 126 may help detect a state of the electronic device 100 so as to determine a suitable time point to perform a calibration. The sensors 126 may also detect physical movements, physical characteristics, or other behaviors from the user to assist in providing more accurate information, such as status or state, to the processor 120 and/or the controller 108. The sensors 126 work with the processors 120, the controller 108, and/or other suitable components in the electronic device 100 to determine when and/or what type of the haptic output, control signal, or haptic calibration may be provided. In one example, based on the detected data/information, the sensors 126 may determine when a calibration may be performed to the haptic system 130 or other systems in the electronic device 100 as needed.

It is noted that other additional components, features, or functional devices may also be included in the electronic device 100 or in the haptic system 130. For example, noise filters, an analogue-to-digital converter (ADC) or digital-to-analogue converter (DAC), an amplifier, or other devices to quantize and analyze the signal and/or haptic output as needed.

Figure 2A:
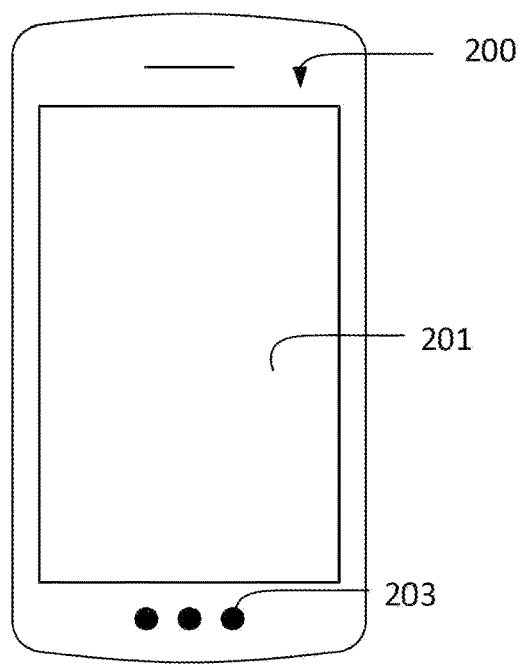
FIG. 2A-2C illustrate different examples of the electronic devices that may utilize the haptic system of FIG. 1 according to aspects of the disclosure.
Figure 2B:
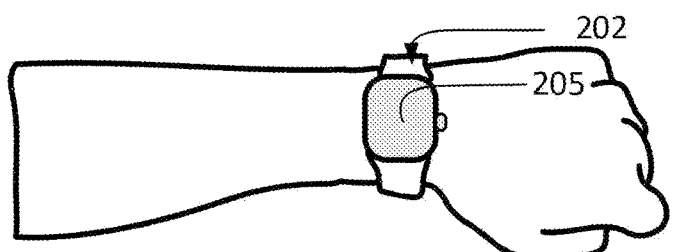
Figure 2C:
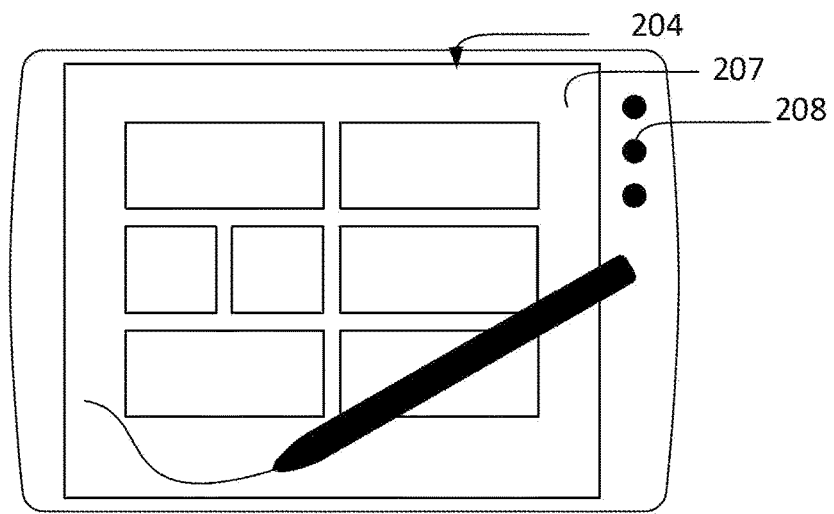

FIGS. 2A-2C depict multiple examples where the electronic devices 100 may include. In the example depicted in FIG. 2A, the electronic device 100 may be a portable device 200, such as mobile phone or a smart phone. The mobile phone 200 may include an input device 201, 203, such as a touch screen, a button, or a display, that may utilize the haptic system 130 that provides a vibratory output or other suitable outputs to the user. The input devices 201, 203 provides an interface that allows the users to perform a calibration process to the haptic system 130 as needed.

In the example depicted in FIG. 2B, the electronic device 100 may be a wearable device 202, such as a smart watch, wristbands or straps and the like. Although the example depicted in FIG. 2B is a smart watch, it is noted that the wearable devices may include smart eyewear, fitness tracker, smart clothing or shoes, wearable medical device, smart jewelries, navigation devices, activity trackers, and so on. The wearable device 202 includes an input interface 205, such as a touch screen, a button, or a display, that may utilize the haptic system 130 that provides a vibratory output, tactile output or other suitable outputs to the user. The input interface 205 provides an interface that allows the users to perform a calibration process to the haptic system 130 as needed.

In the example depicted in FIG. 2C, the electronic device 100 may be a tablet computer 204 or other suitable portable electronic devices, such as a laptop computer or so on. The tablet computer 704 includes an input interface 207, 208, such as a touch screen, keyboard, a button, or a display, that may utilize the haptic system 130 that provides a vibratory output, tactile output or other suitable outputs to the user. The input interface 207, 208 provides an interface that allows the users to perform a calibration process to the haptic system 130 as needed.

It is noted that examples depicted in FIGS. 2A-2C are exemplary only. It is noted that the haptic system 130 capable of performing the on-chip calibration may be incorporated into substantially any type of electronic device that needs haptic output. Other suitable examples of the electronic device may be a time keeping device, a navigation device, a sports device, a music player, a health device, smart camera, personal digital assistance, and so on that may include one or more of the haptic systems 130. It is also noted that one or more of the haptic system 130 may be included in any type of the component within or connected to the electronic device 100.

Figure 3:
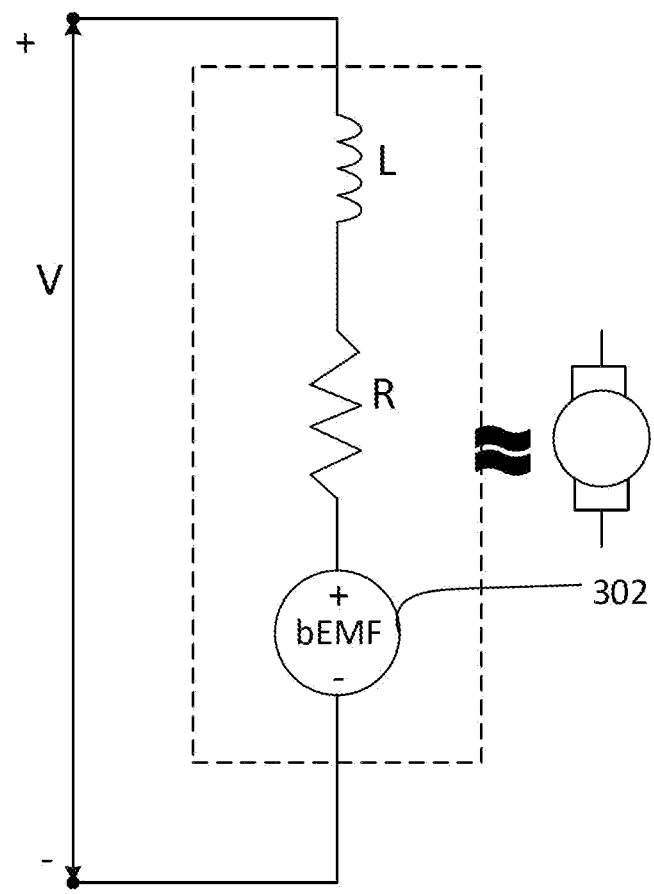
FIG. 3 illustrates an example of an electrical model of a mechanical device according to aspects of the disclosure.

FIG. 3 illustrates an electrical model of the actuator 104. The actuator 104 is represented by three electrical components in FIG. 3. A resistive component R represents a resistance in the actuator 104, such as a motor. An inductive component L represents an inductance in the actuator 104. A bEMF component 302 represents an electrical signal (e.g., a bEMF) generated by the motion of the actuator 104. Thus, the voltage V at the actuator 104 may be characterized by the equation below where R is the resistance, I is the current, L is the inductance, $\dot{I}$ is a rate of change of the current, and $E_m$ is the bEMF.

$$V = RI + L\dot{I} + E_m$$

$E_m$ may be further defined as KV, where K is a motor constant and v is the velocity. Thus, during the calibration, one or more of these characteristics (e.g., parameters including R, I, L or Em) may be detected. Detection of these characteristics may assist understand the baseline and standard (e.g., a reference data) of the actuator 104. In one example, the characteristic or parameter detected may be the resistance R of the actuator 104, the inductance L of the actuator 104, or other suitable characteristics that may assist computing a suitable output or baseline of the bEMF as needed.

Figure 4:
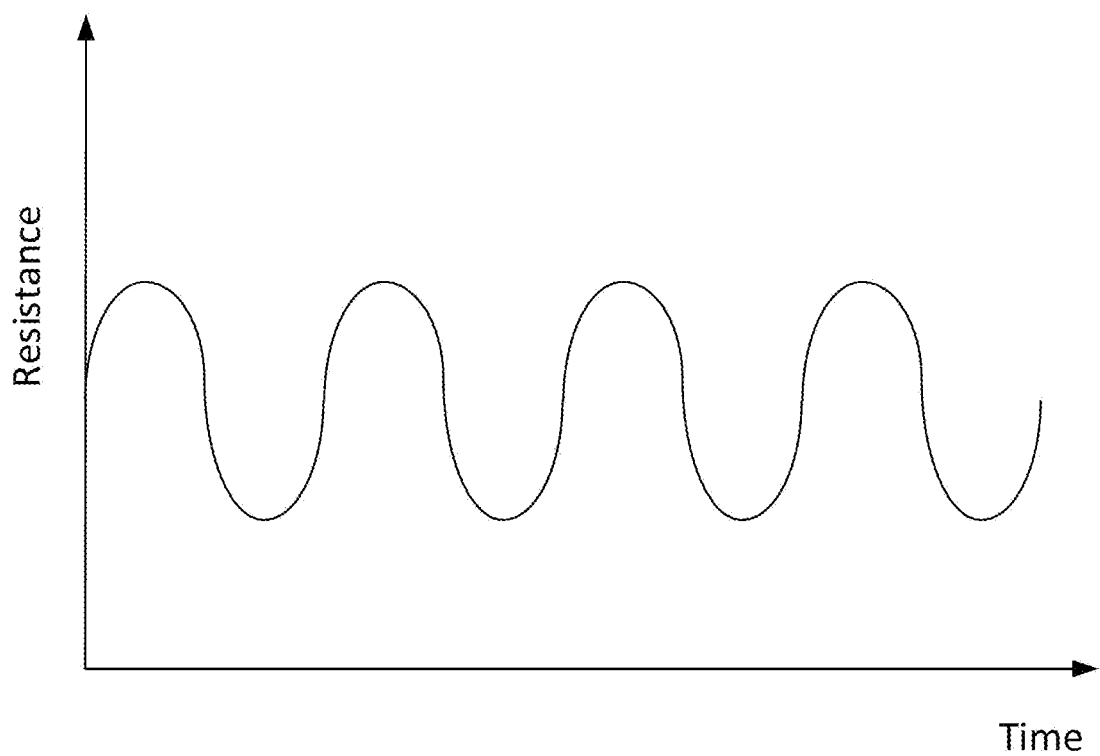
FIG. 4 illustrates an example of a waveform of a drive signal according to aspects of the disclosure.

For example, FIG. 4 depicts an output waveform of the resistance R of an actuator as detected over a predetermined of time. The output waveform of the resistance R may be stored and saved as a reference data so as to assist computing a suitable range and intensity of electrical signal of the bEMF that might be generated when the actuator 104 is in motion. This data is then saved as a reference data. Although the example depicted in FIG. 4 is an output waveform of the resistance, it is noted that other characteristics or parameters, including the voltage, inductance, frequency, current, momentum, displacement and so on, may also be measured to build a database for the electronic device 100 as needed. Such database may be stored in the memory 122 of FIG. 1.

Figure 5A:
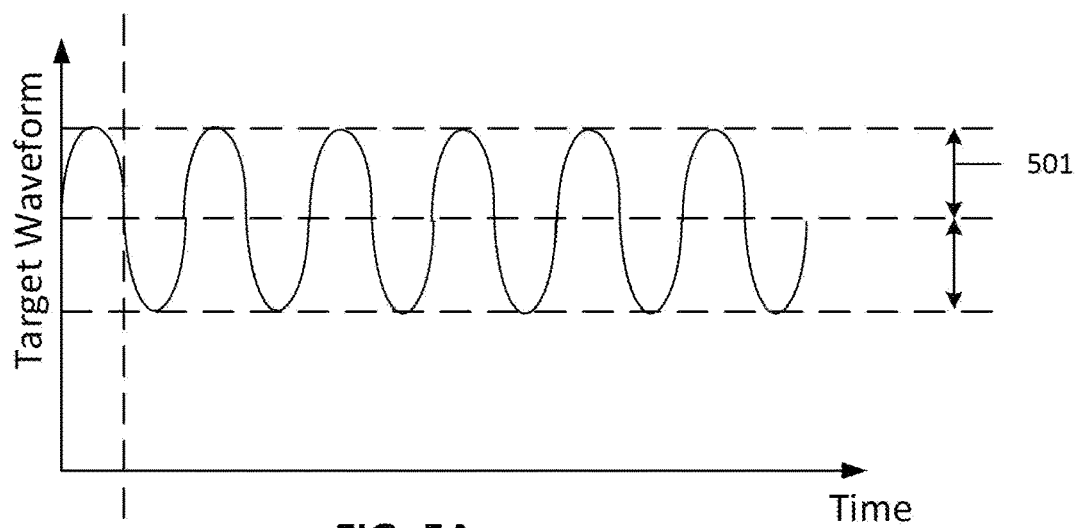
FIGS. 5A-5C illustrate various examples of output waveforms according to aspects of the disclosure.
Figure 5B:
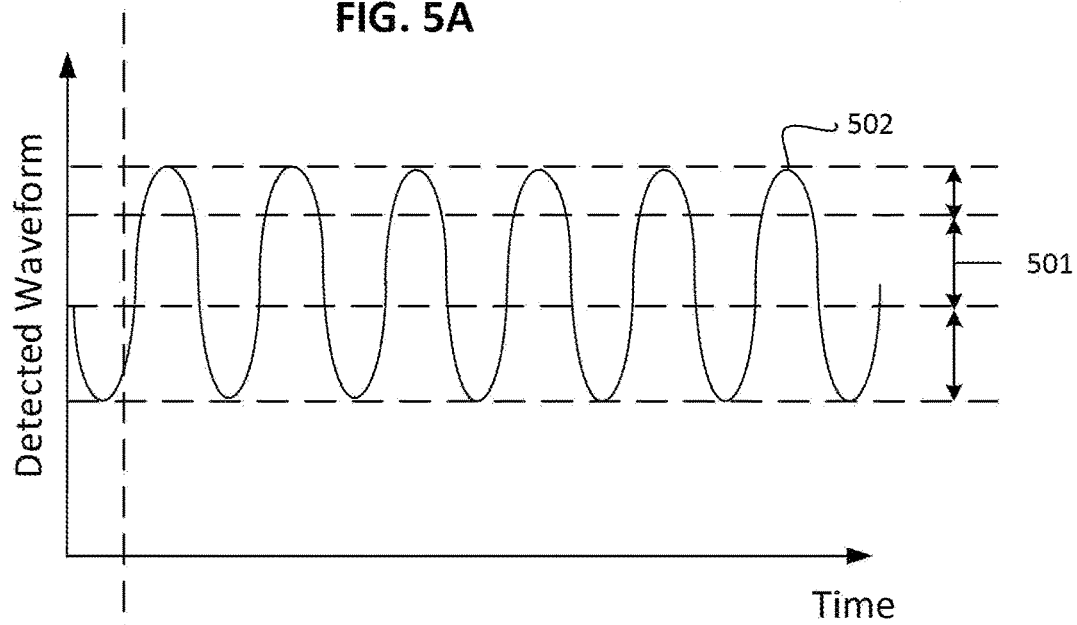
Figure 5C:
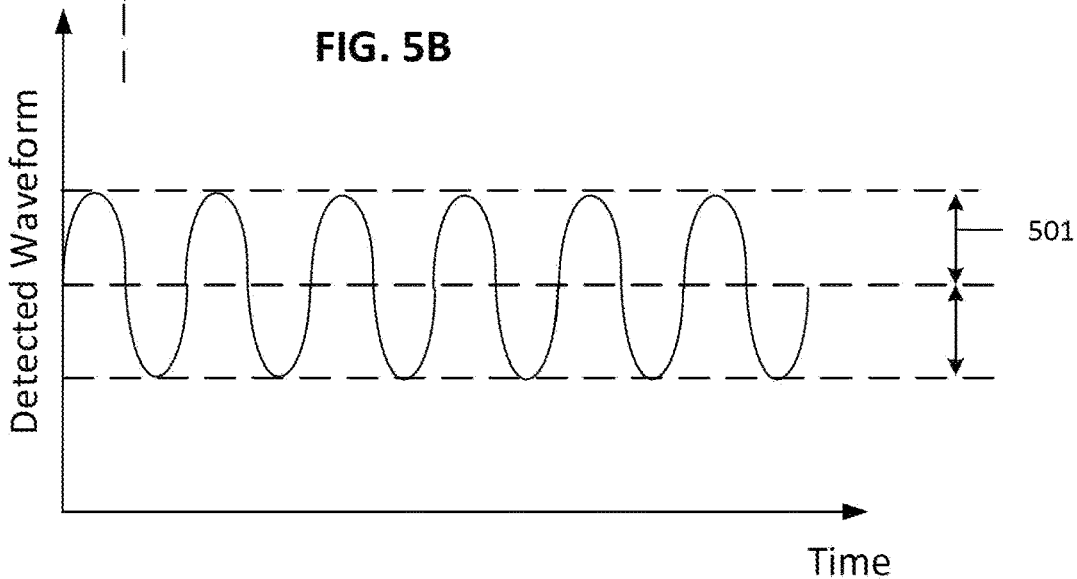

FIGS. 5A-5C illustrate different examples of the output waveforms of the bEMF signal. FIG. 5A illustrates a reference/target output waveform with a desired profile, such as a desired profile of a sinusoidal waveform. FIG. 5B illustrate one example of a detected/measured output waveform of the bEMF signal during calibration with overly high magnitude that has a peak value 502 greater than the desired range 501 in the positive phase. FIG. 5C illustrates an example of a detected/measured output waveform of the bEMF signal after calibration that the detected sinusoidal waveform matches to the reference/target output waveform at the desired range 501. In one example, the sinusoidal waveform as measured at FIG. 5B may be adjusted or tuned by utilizing a voltage scaling factor so as to scale down the overly high magnitude of the measured sinusoidal waveform from FIG. 5B, matching the measured sinusoidal waveform to the reference/target output waveform.

It is noted that multiple output waveforms and data extracted from the bEMF signal may be analyzed and compared with the reference points, reference data, reference waveforms and so on from the database stored in the memory device 122 or other suitable database available to the electronic device 100 during the calibration process.

Figure 6:
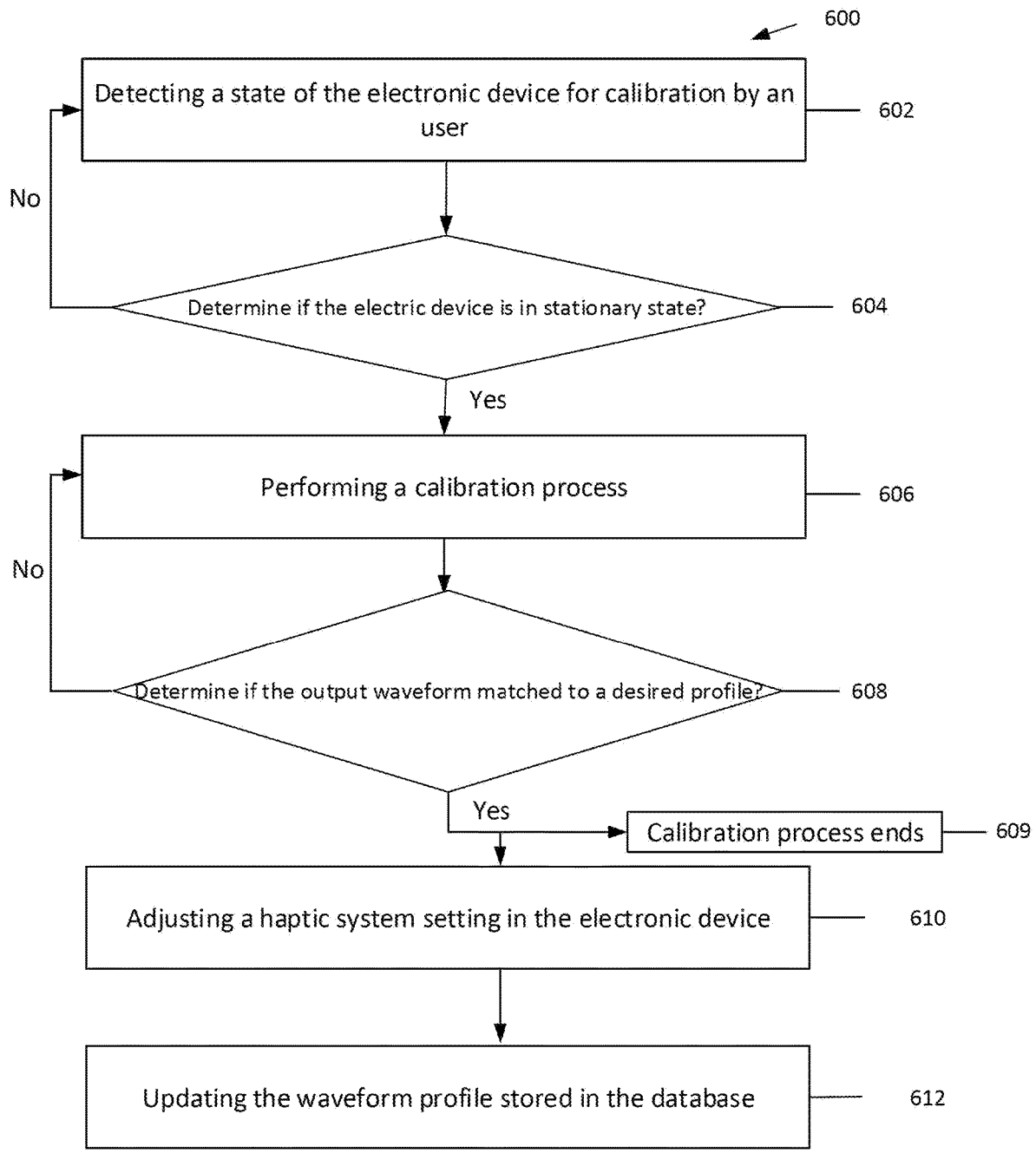
FIG. 6 is a flow diagram illustrating one example of a method of calibration according to aspects of the disclosure.

FIG. 6 depicts one example of a calibration process 600 for calibration of a haptic system in an electronic device from a user site (e.g., an in-field tuning from a customer where the electronic device has been shipped to the customer from a factory or facility). Prior to the shipment of the electronic device 100 to the user, the calibration process 600 may be performed to ensure that the haptic output has a desired performance. Such calibration may assist compensating device to device variations, mass production deviations or manufacturing tolerance. As described above, after the electronic device 100 is in use by a user over time, the haptic effect may be drifted or altered. Thus, the calibration process 600 provides an in-field tuning process that allows a user to calibrate the electronic device 100 in a user site when needed. In some situations, a user may perform the in-field tuning process to customize the haptic effect based on user's preference or habits prior to or after use of the electronic device 100.

While FIG. 6 shows blocks in a particular order, the order may be varied and the multiple operations may be performed simultaneously or in any order as needed. Also, operations may be added or omitted.

The process 600 starts at operation 602 by detecting a state of the electronic device, such as the electronic device 100 depicted in FIG. 1. In some examples, multiple different states, such as in use state, active state, stationary state, etc., may be detected for the electronic device 100 under different circumstances. In one example, a stationary state may be defined to require the electronic device 100 to be maintained in a non-moving, absence of movement, or non-interaction state for a predefined length of time. For example, the stationary state requires the electronic device 100 to be not moving for approximately more than 3 seconds. In another example, the stationary state is defined to require the electronic device 100 to be not moving for any specified length of time. The stationary state may also be defined by absence of movements exceeding a predefined threshold for a specified length of time. The specific types of movements and the predefined threshold can be defined in various ways. In one example, the movement may be defined and measured by a predefined movement output from the sensors 126 in the electronic device 100. The predefined threshold may be defined by a specific magnitude or by a given sensor output from the sensors 126.

It is noted that multiple types of the sensors may be utilized to gather the information to determine which state the electronic device 100 is in. In one example, a distance moved is detected by the sensor 126 and the electronic device 100 is determined to be in a stationary state as long as the distance moved by the electronic device 100 does not exceed a predefined distance threshold. Similarly, a movement, including rotatory movement, translational movement, or other types of the movement with or without specific orientations, may also be detected by the sensor 126 to properly define whether the electronic device 100 is in a motion, active, stationary or other state.

At operation 604, determining whether a stationary state of the electronic device 100 is reached. In one example, when the electronic device 100 is detected to be in a stationary state, the calibration process is then proceeded further to the next operation 606 to continue performing the calibration process. For example, a feedback signal may be delivered to the processor 120 or directly to the controller 108 in the haptic system 130 to readily perform the calibration process for the haptic system 130 when a stationary state is detected. In contrast, when the electronic device 100 is detected to be in use state, active state, or movement state, the calibration process 600 loops back to operation 602 until a stationary state of the electronic device 100 is detected.

It is noted that performing calibration of the electronic device 100 when in the stationary state may avoid bias or noise from external stimuli, or false detection while performing the calibration process. Thus, maintaining the stationary state of the electronic device 100 during the calibration may enhance calibration accuracy.

At operation 606, a calibration operation is then performed. The details of the calibration operation is further described below with reference to FIG. 7. The calibration operation may be pre-programed in the controller 108 in the haptic system 130, or in the processor 120 so that the user may easily perform the calibration operation by pressing a button or touching a user interface integrated in the electronic device 100. In one example, during operation 606 for the calibration operation, a drive signal from the haptic driver 102 may be generated and delivered to the actuator 104 that results in a vibration that a bEMF signal is generated from the actuator 104. The bEMF signal provides an output waveform that is then analyzed. The details of the calibration operation is further elaborated below with reference to FIG. 7.

At operation 608, the output waveform of the bEMF signal is compared to determine whether the output waveform matches to a target waveform profile. When the output waveform matches to the desired target waveform profile, the calibration process is then completed and terminated, as shown in operation 609. In contrast, when the output waveform does not match the desired target waveform profile, the calibration process then proceeds to operation 610, to adjust parameter settings in the haptic system 130.

It is noted that when the output waveform does not match the desired waveform profile, the operation 608 may be looped back to operation 606 to perform a series of measurement and detection to determine a proper input range for the drive signal until the desired target output waveform profile is obtained and matched. Thus, operations 606 and 608 may be repeatedly performed to calibrate the output waveform from the bEMF until the detected output waveform matches to the target waveform. It is noted repetitive tuning and calibration between operations 606 and 608 may increase the accuracy of the profile match of the detected output waveform to the target waveform. The repetition from operations 606 to 608 may be as many times as needed.

At operation 610, an adjustment of the characteristics, scale, and parameters for the drive signal from the haptic drive 102 to the actuator 104 is performed to adjust, calibrate, and re-program the haptic system 130 to have the output waveform profile matched to the target waveform profile. The characteristics and parameters of the drive signal being calibrated may be a current drive signal, a voltage drive signal or other types of the characteristics and parameters of drive signal as needed. In one example, adjustment of the drive signal may be performed by aligning the peak value (or profile) of the measured/detected output waveform (either current or voltage output waveforms) with the desired peak value (or profile) of the target waveform. This adjustment may as well change the resonance frequency of the bEMF, which corresponds to the vibration of the mechanical device 106. In another example, the amplitude of the drive signal may also be adjusted according to the desired vibration strength as the amplitude of the drive signal may be equal to or close to the bEMF, which is proportional to the vibration strength. Other adjustments, such as peak displacement adjustment and the like, may also be performed to calibrate the drive signal until a desired/target output waveform of the bEMF is obtained. As a result, after the calibration and adjustment, the haptic effect with desired output performance based on a user's preference or for compensation of manufacturing tolerance or variations may be obtained.

In one example, the adjustment and/or calibration information is then programed to the haptic system 130, such as the controller 108 in the haptic system 130, updating the settings in the haptic system 130 to meet user's expectation. Thus, after the calibration and adjustment, the haptic effect with desired output performance based on a user's preference or for compensation of manufacturing tolerance or variations may be obtained.

At operation 612, the information regarding the adjustment or calibration of the parameters, characteristics, or profile of the drive signal may be saved in a memory device, such as the memory device 122 in the electronic device 100. The information may be stored and updated in the database library for future uses, or as a new reference standard for future calibration. It is noted that such information may also be saved in other suitable memory devices embedded in the electronic device 100, haptic system 130, or remotely accessible by the electronic device 100 as needed. Accordingly, the information regarding the adjustment or calibration of the parameters, characteristics, or profile of the drive signal may be easily accessible and reusable by an user or a working staff in a factory or facility to perform an additional calibration process when the haptic effect (e.g., the haptic output) is altered. In the example wherein information is not desired to be saved, the operation 612 may be eliminated or omitted as needed.

Figure 7:
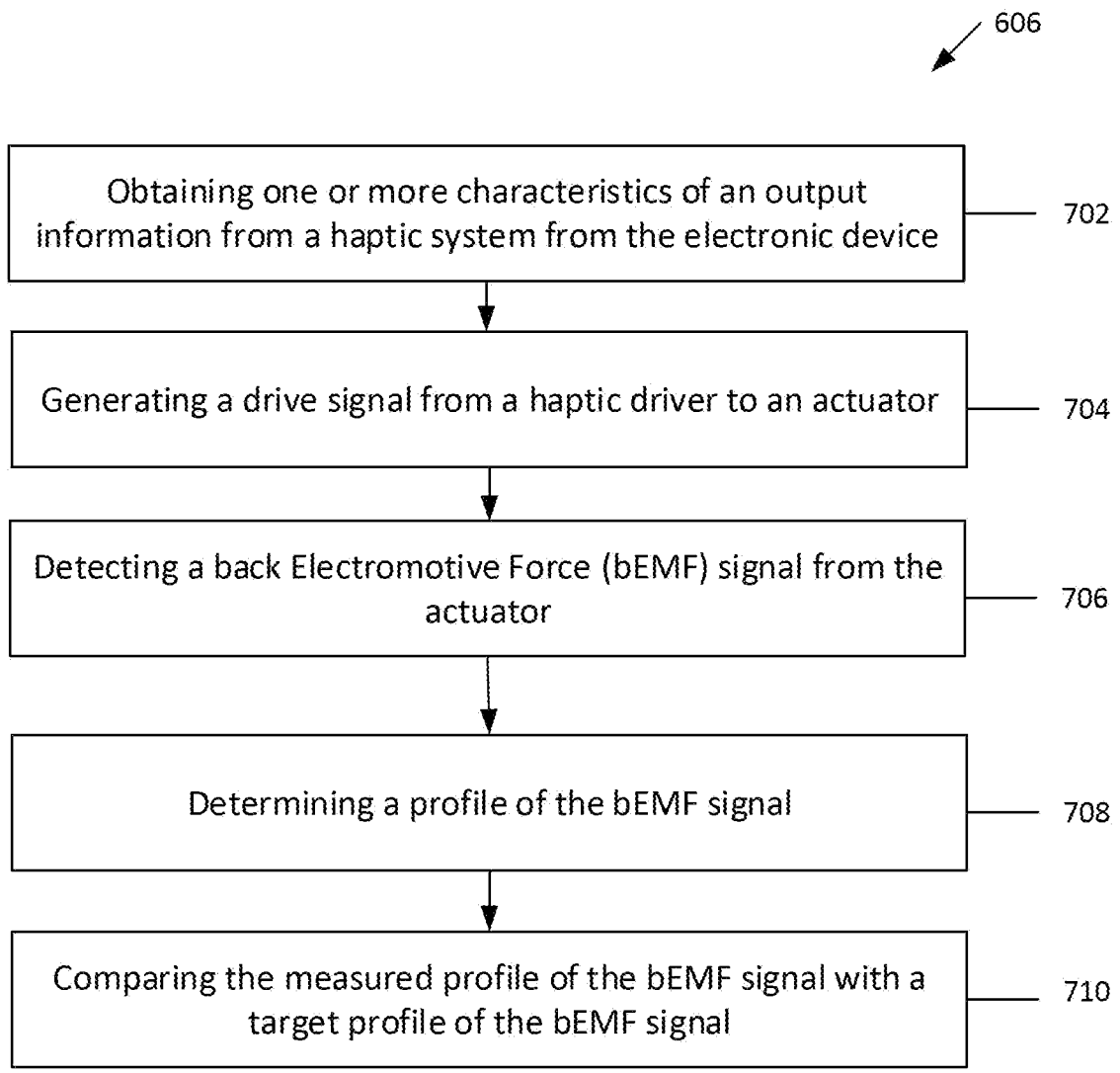
FIG. 7 is a flow diagram illustrating another example of a method of calibration according to aspects of the disclosure.

FIG. 7 illustrates a sub-flow diagram of the operation 606 depicted in FIG. 6 for the calibration operation performed in the haptic system 130. The operation 606 includes multiple blocks to perform the calibration operation in the haptic system 130. The operation 606 of the calibration operation starts at block 702 by detecting one or more characteristics of the actuator 104. For example, a test signal may be applied to the actuator 104 to gather the one or more characteristics of the actuator 104. The one or more characteristics of the actuator 104 being obtained and detected may be resistance R, inductance L, frequency, current, momentum, displacement of the actuator 104. This data is then saved as a reference data to build a database for the electronic device 100 as needed. Such database may be stored in the memory 122 of FIG. 1.

At block 704, a drive signal is generated from the haptic driver 102 to the actuator 104. The drive signal may be a continuous signal, a pulsed signal, a modulated signal or any suitable signal as needed. The haptic driver 102 may first receive an input signal from the controller 108 or from a processor 120 or from other user interface so as to generate the drive signal. The drive signal is then transmitted to the actuator 104. The drive signal excites the mechanical device 106 into a motion, which causes a mass of the mechanical device 106 to vibrate, thus generating a haptic effect (e.g., a haptic output) that is felt by the user. This vibration includes an electrical signal that includes a signal of the bEMF. In one example, the drive signal may be a current signal or a voltage signal. In one example, the drive signal may provide a sinusoidal drive signal (e.g., a sinusoidal waveform).

At block 706, the electrical signal of the bEMF is detected and measured. The electrical signal of the bEMF may be detected from the coils, wires, electrical lines, connection pins and so on that is in electrical connection to the mechanical device 106 to obtain the motion produced by the mechanical device 106. The scale or amplitude of the bEMF signal is an indicative of scale of the motion of the actuator 104. Tracking of the bEMF signal may also understand of the operation of the actuator 104. In one example, the electrical signal of the bEMF may be a voltage signal. A frequency of the bEMF signal may correspond to or be an indicative to a resonant frequency of the actuator 104 and the amplitude of the bEMF signal may correspond to or be an indicative to a vibration magnitude (e.g., haptic strength) to the mechanical device 106. The bEMF signal may then transmitted and fed back to the controller 108 in the haptic system 130 for further analysis and calibration.

At block 708, a profile or characteristic of an output waveform of the bEMF signal is determined and analyzed. The output waveform of the bEMF signal may be analyzed by the controller 108 of the haptic system 130, the processor 120 from the electronic device 100, or other suitable devices in the haptic system 130 or in the electronic device 100. The output waveform may include both positive phases and negative phases.

At block 710, the measured output waveform of the bEMF signal is then compared with a reference waveform or target waveform to determine how much calibration is needed. The comparison of the measured output waveform to the reference or target waveform is used to program and/or adjust the drive signal input from the haptic driver 102 to the actuator 104 so that a haptic effect with a desired mechanical resonant frequency and/or a desired vibration amplitude is obtained. The reference or target waveform may be the data detected or computed from the test run at block 702 as described above. Alternatively, the reference or target waveform may be from a database library preset or pre-saved in the memory device in the haptic system 130 or in the electronic device 100. Similar to the description above with references to FIGS. 5A-5C, the measured output waveforms may be in various profiles. The multiple output waveforms and data extracted from the bEMF signal may be analyzed and compared with the reference points, reference data, reference waveforms and so on from the database stored in the memory device 122 or other suitable database available to the electronic device 100 to determine a proper adjustment of the parameters to the haptic system 130 when needed.

Thus, methods for calibrating a haptic system is provided in the present disclosure. The calibration of the haptic system may be performed in a facility prior to a shipment to a user. The calibration may also be performed by a user prior to his/her use of the haptic system or after his/her use over time. As the haptic system can perform the calibration process in the haptic system without using additional extraneous parts, such as external sensors, the haptic system may also be referred as a sensorless haptic system that may facilitate an efficient and convenient on-chip calibration. The sensorless haptic system may further compact the size of the electronic device, providing the user with a lightweight and easy carriable wearable or portable device with enjoyable user experience.

Unless otherwise stated, the foregoing alternative examples are not mutually exclusive, but may be implemented in various combinations to achieve unique advantages. As these and other variations and combinations of the features discussed above can be utilized without departing

The invention claimed is:

1. A method, comprising:
    detecting a stationary state of an electronic device including a haptic system;
    performing a calibration process for the electronic device, the calibration process including:
        comparing an output waveform from a back Electromotive Force (bEMF) signal from an actuator in the haptic system with a reference standard comprising a scale for a target sinusoidal waveform set for the bEMF signal; and
        adjusting, based on the comparison, a scale of a drive signal generated from a haptic driver in the haptic system to calibrate the haptic system; and
    storing the adjusted scale in a memory of the electronic device as a new reference standard for future calibration.

2. The method of claim 1, wherein the calibration process further comprises:
    generating the drive signal from the haptic driver in the haptic system;
    transmitting the drive signal to an actuator in the haptic system;
    detecting the bEMF signal from the actuator in the haptic system; and
    analyzing the output waveform from the bEMF signal, wherein the output waveform from the bEMF signal comprises a sinusoidal waveform.

3. The method of claim 1, further comprising repeatedly performing the calibration process until the output waveform matches the target sinusoidal waveform set.

4. The method of claim 1, wherein adjusting the scale of the drive signal further comprises adjusting an amplitude of the output waveform.

5. The method of claim 4, further comprising altering a haptic output generated from the actuator in the haptic system.

6. The method of claim 1, further comprising receiving an input signal applied to the haptic system to generate the drive signal.

7. The method of claim 6, wherein the input signal is applied by a user.

8. The method of claim 6, wherein the input signal is applied by a working staff in a factory.

9. The method of claim 1, wherein the drive signal is in direct communication with the actuator disposed in close proximity to the haptic driver in the haptic system.

10. The method of claim 1, wherein the drive signal is a voltage signal or a current signal.

11. The method of claim 1, wherein the calibration process is performed in an electronic device.

12. The method of claim 11, wherein the electronic device is a wearable device or a portable device.

13. A method for performing a calibration process in an electronic device, comprising:
    tracking a haptic output from an actuator in a haptic system;
    comparing an output waveform of a back Electromotive Force (bEMF) signal from the actuator in the haptic system with a reference standard comprising a scale for a target sinusoidal waveform set for the bEMF signal;
    adjusting, based on the comparison, a scale of the haptic output to calibrate the haptic system; and
    storing the adjusted scale of the haptic output in a memory device in the electronic device as a new reference standard for future calibration.

14. The method of claim 13, wherein tracking the haptic output further comprises generating a drive signal to the actuator to detect the bEMF signal comprising a sinusoidal waveform from the actuator.

15. The method of claim 14, further comprising adjusting a voltage or current applied to a haptic driver in the haptic system in response to the sinusoidal waveform from the tracked haptic output.

16. The method of claim 13, wherein the haptic system is embedded in the electronic device.

17. The method of claim 13, further comprising repeatedly performing the steps of tracking the haptic output, comparing the output waveform with the target sinusoidal waveform, and adjusting the scale of the haptic output until the output waveform matches the target sinusoidal waveform.

18. An electronic device comprising:
    a haptic system disposed in an electronic device, the haptic system comprising:
        a haptic driver; and
        an electromagnetic (EM) actuator disposed in close proximity to the haptic driver, wherein the electromagnetic (EM) actuator is configured to generate a back Electromotive Force (bEMF) signal comprising sinusoidal waveform when actuated for a calibration process of the haptic system; and
    a memory configured to store an adjusted scale of the haptic system as a new reference standard for future calibration.

19. The electronic device of claim 18, wherein detection of the bEMF signal for the calibration process is repeatedly performed until a target sinusoidal waveform is obtained.

20. The electronic device of claim 18, wherein the electronic device is a wearable device or a portable device.

* * * * *